J. ALLEN.
FLY CATCHER.
APPLICATION FILED APR. 26, 1916.
1,225,556.
Patented May 8, 1917.
2 SHEETS—SHEET 1.
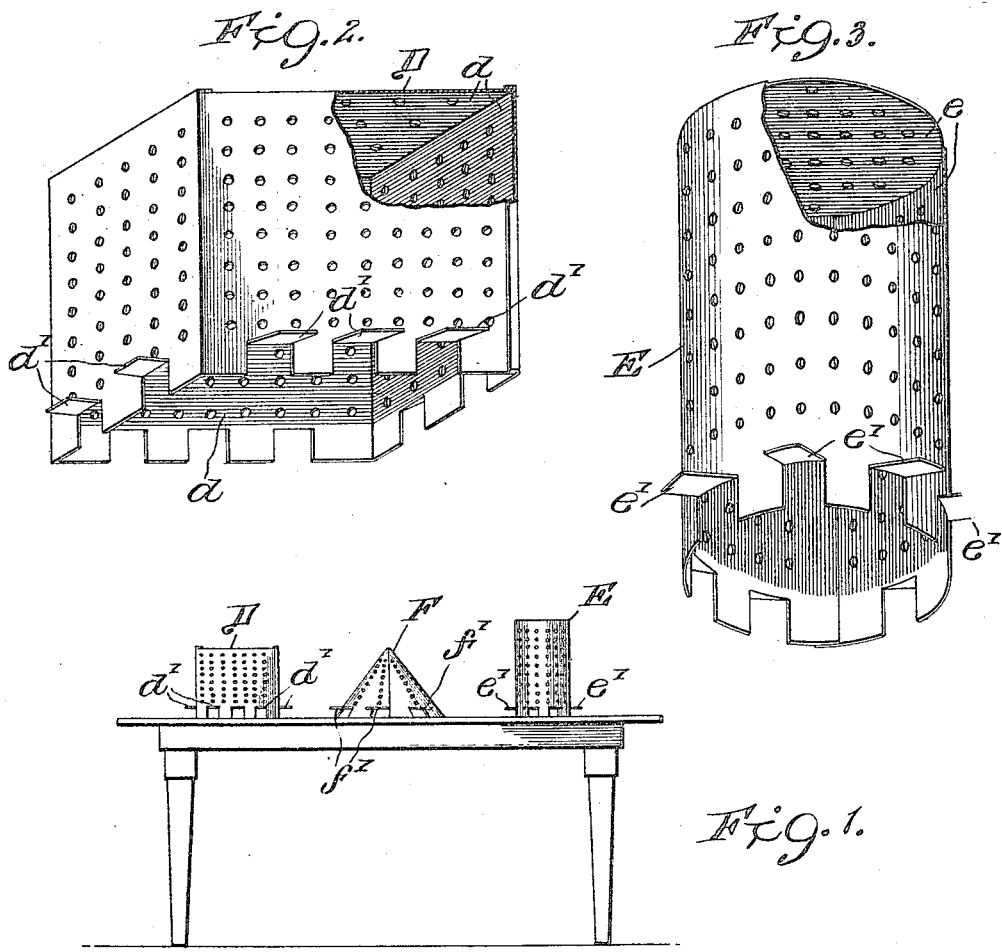
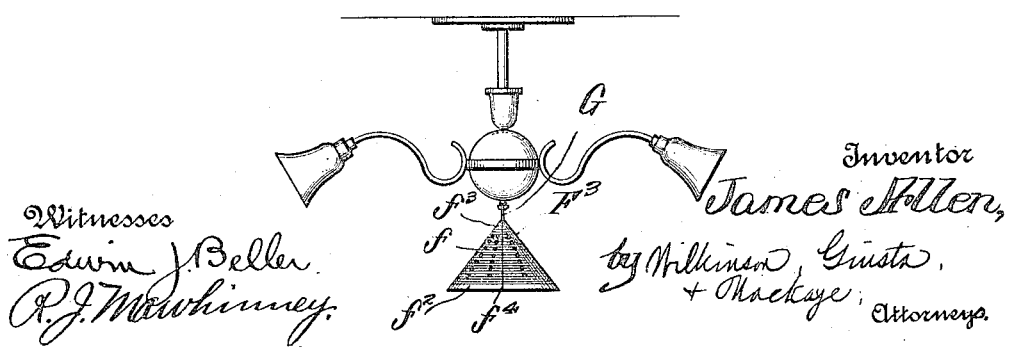

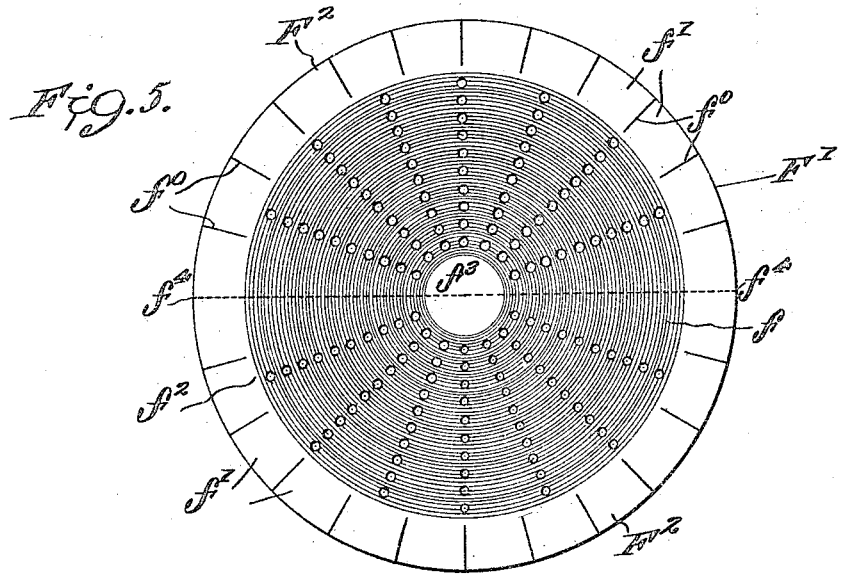
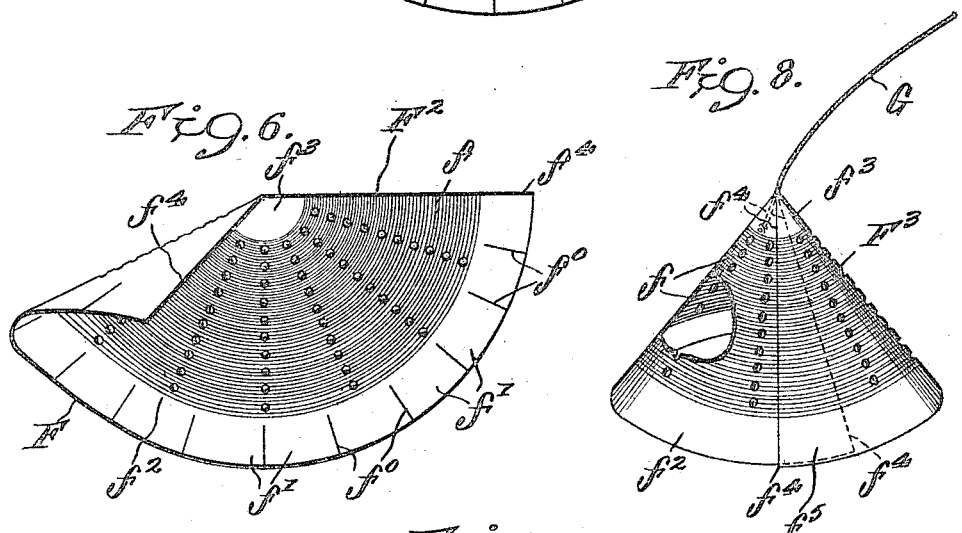
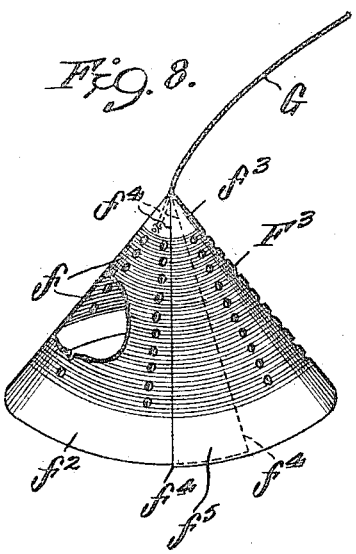
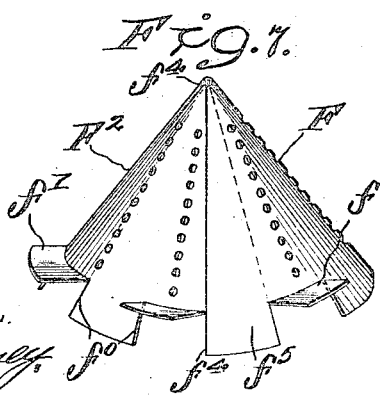

UNITED STATES PATENT OFFICE.

JAMES ALLEN, OF WASHINGTON, DISTRICT OF COLUMBIA.

FLY-CATCHER.

1,225,556.  Specification of Letters Patent.  Patented May 8, 1917.

Application filed April 26, 1916. Serial No. 93,741.

*To all whom it may concern:*

Be it known that I, JAMES ALLEN, a citizen of the United States, residing at Washington, in the District of Columbia, have invented certain new and useful Improvements in Fly-Catchers; and I do hereby declare the following to be a full, clear, and exact description of the invention, such as will enable other skilled in the art to which it appertains to make and use the same.

My present invention relates to improvements in fly catchers, and it is intended to provide a fly catcher appliance operating on the principle of the well known adhesive paper, in which the fly's feet or wings become entangled and it is unable to escape.

The ordinary sticky paper is seriously objectionable, in that it is very apt to be so placed as to be in the way of persons, more especially children, and also animals, etc., besides presenting a very unsightly appearance when more or less covered with dead flies.

According to my invention I provide a device which is not likely to be in the way, and which is especially attractive to flies, and in which they may be trapped without presenting an unsightly appearance. I have noted that flies are apt to fly toward the light, and that if an ordinary sheet of adhesive paper be placed or hung between the fly and the light, the fly will not be apt to come in contact with the same; but if a series of perforations are provided in the paper which will permit the passage of light therethrough, the fly will wing its course toward these illuminated openings, and will be entangled in the adhesive mixture already placed on the surface of the paper.

The same principle may be applied to receptacles which are wholly or partly open at the bottom, and are provided with a coating of adhesive material on the interior, the exterior being preferably free from such material for convenience in handling, etc.

My invention will be more fully understood by reference to the accompanying drawings, in which:

Figure 1 shows a table provided with a series of fly traps mounted thereon of different forms;

Fig. 2 is a perspective view showing, on a large scale, the rectangular fly trap shown in Fig. 1, parts being broken away;

Fig. 3 is a similar view showing the cylindrical fly trap shown in Fig. 1, parts being broken away;

Fig. 4 shows a chandelier provided with one of the conical fly traps suspended therefrom;

Fig. 5 shows a sheet of paper in the circular form which may be used flat like a mat to trap flies, or which may be cut in two and bent up to form conical traps such as are shown in Figs. 6 and 7; and Fig. 8 shows a conical fly trap adapted to be suspended from a chandelier or elsewhere, in which there is an adhesive coating on both sides of the sheet, parts being broken away in this figure.

Referring first to Figs. 1, 2, 3, and 7, Fig. 1 shows three kinds of receptacle adapted to be used on a table, or shelf, or the like, in which the open bottom of the receptacle rests on the table or support, and in which a series of openings at the sides of the bottom are provided, to permit the entrance of the flies.

D, shown in detail in Fig. 2, represents a rectangular box having the sides and walls made of paper or similar material, lined with sticky composition $d$, and having an open bottom provided with a series of port holes formed by cutting tabs $d'$ at the bottom edges of the sides. For convenience of manipulation, the lower edge of the sides is left clear of sticky material.

Any suitable bait may be placed on the table or shelf inside of the receptacle D, and the flies will enter through the port holes and after taking the bait will attempt to fly upward and outward through the top or sides of the box, being attracted by the light passing through the perforations, and will be trapped in the sticky material.

In the form shown in Fig. 3 the receptacle E is cylindrical in shape, and coated on the inside with sticky material, as at $e$, and is provided with a series of ports formed by turning up any desired number of tabs $e'$ at the lower edge of the cylindrical shell. This trap may be also baited as explained with regard to the trap shown in Fig. 2, and as before stated the flies in endeavoring to escape will fly to the light passing through the perforations, and will be trapped on the inner walls of the receptacle.

The trap F shown in Figs. 1 and 7 is made of conical shape, coated with sticky material on the inside as before described, and is provided with a series of tabs $f'$ adapted to form port holes in which the flies may enter, and the flies will attempt to escape upward, being attracted by the light passing through the perforations, and will be trapped on the sticky interior of the cone.

A convenient mode of constructing the conical trap shown in Figs. 1 and 7 is illustrated in Figs. 5 and 6, in which F' represents a circular sheet of paper of the desired degree of opacity, which is provided in its center with a coating of sticky material, which is preferably in the form of a ring, leaving the space $f^3$ uncoated, and this space $f^3$ may be also covered with the adhesive material if desired. Exterior to this coating zone $f$, I preferably provide an annular ring $f^2$, which is not coated with this adhesive material, and this ring is radially slotted, as at $f°$, to form a series of tabs $f'$, some of which may be bent up to form port holes or door openings, as shown in Figs. 1 and 7.

By leaving the annular band $f^2$ free from the sticky coating, the tabs $f'$ may be more conveniently manipulated. This sheet F' is preferably perforated transversely, as at $f^4$, so that it may be torn or cut into two pieces, and each piece may be folded as shown in Fig. 6 to form a separate conical tent or fly trap, as shown in Fig. 7.

When so folded the overlap $f^5$ will be formed, and the adhesive material will cause the parts to stick together, thus rendering it possible to very quickly and conveniently construct a pair of fly traps from a single sheet, such as shown in Fig. 5.

It will be noted that the fly trap shown in Figs. 1, 2, 3, and 7 all have the sticky material on the interior, so that they may be conveniently handled and removed from place to place and without any chance of getting the fingers soiled with the sticky material, and more especially without the dead flies trapped on the interior of the receptacle being in evidence. Thus the disgusting spectacle of a sheet littered with dead flies is done away with.

In the form of device shown in Figs. 4 and 8, the conical trap $F^3$ is constructed generally similar to that shown in Fig. 7, except that the base of the trap may be made continuous instead of being cut up into a number of tabs, and both inside and outside of the traps may be coated with adhesive material, as shown in Fig. 8.

For convenience of handling, however, it is preferable to have the cap of the cone and also the lower portion thereof free from adhesive material, as shown at $f^2$ and $f^3$ in Fig. 8. This form of trap may be conveniently attached by the string G to a chandelier, such as shown in Fig. 4, or may be suspended from any other object in the room.

In any of the forms of trap shown the construction is so cheap that the trap may be very readily thrown out with the refuse, or burned after it has performed its functions.

While I have shown the perforated sheet in Figs. 1 to 7 as coated with sticky material on one side only, which is the preferred form of construction, it will be obvious that the sticky material may be applied to both sides of the sheet if desired; the principal idea of the invention being in each instance the fact that the flies will be attracted to the light and will be blinded thereby, so that they will fly into the sticky material and become entangled therewith.

The size of the perforations in the various forms of fly catcher to admit light should preferably be comparatively small, in any event not large enough to permit the insect to fly therethrough, and preferably smaller.

While I have shown various modes of applying the invention, it will be obvious that other forms of fly trap might be designed which could be used without departing from the spirit of my invention.

Having thus described my invention what I claim and desire to secure by Letters Patent of the United States is:

1. A fly catcher comprising a receptacle made of non-transparent sheet material open at the bottom and closed at the top and coated on the interior with sticky material, the said receptacle being provided with a series of perforations in its outer walls to permit the passage of light therethrough, and the side walls of said receptacle being provided at their base with a series of tabs bent up so as to form entrance openings for the flies, substantially as described.

2. A fly catcher made of a single semicircular sheet of non-transparent material, bent with its edges overlapping to form a hollow cone, the said sheet being provided on the interior with a coating of sticky material, adapted both to catch the flies and to form a securing means for the overlapping edges forming the joint, and the shell of the said cone being provided with a series of perforations, and the said shell being also provided at its base with a series of tabs bent up so as to form entrance openings for the flies, substantially as described.

3. A fly catcher made of a single semicircular sheet of non-transparent material, provided with a semicircular zone of sticky coating and having a semicircular uncoated band at the outer curved edge thereof, the said sheet being bent to form a hollow cone, and the shell of said cone being provided with a series of perforations to permit the passage of light therethrough, and the shell being also provided at its base with a series of tabs bent up so as to form entrance openings for the flies, substantially as described.

In testimony whereof, I affix my signature.

JAMES ALLEN.